Nov. 7, 1967  TORAHIKO HAYASHI  3,351,026
DEVICE FOR CONTINUOUSLY MAKING SPHERICAL
FILLED ENCRUSTATIONS WITH DOUGH
Filed March 24, 1965  5 Sheets-Sheet 1

INVENTOR.
TORAHIKO HAYASHI
BY
ATTORNEYS

Nov. 7, 1967  TORAHIKO HAYASHI  3,351,026
DEVICE FOR CONTINUOUSLY MAKING SPHERICAL
FILLED ENCRUSTATIONS WITH DOUGH
Filed March 24, 1965  5 Sheets-Sheet 2

INVENTOR.
TORAHIKO HAYASHI
BY Hane and Hydick
ATTORNEYS

Nov. 7, 1967  TORAHIKO HAYASHI  3,351,026
DEVICE FOR CONTINUOUSLY MAKING SPHERICAL
FILLED ENCRUSTATIONS WITH DOUGH
Filed March 24, 1965  5 Sheets-Sheet 4
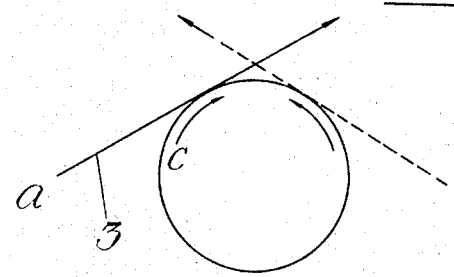
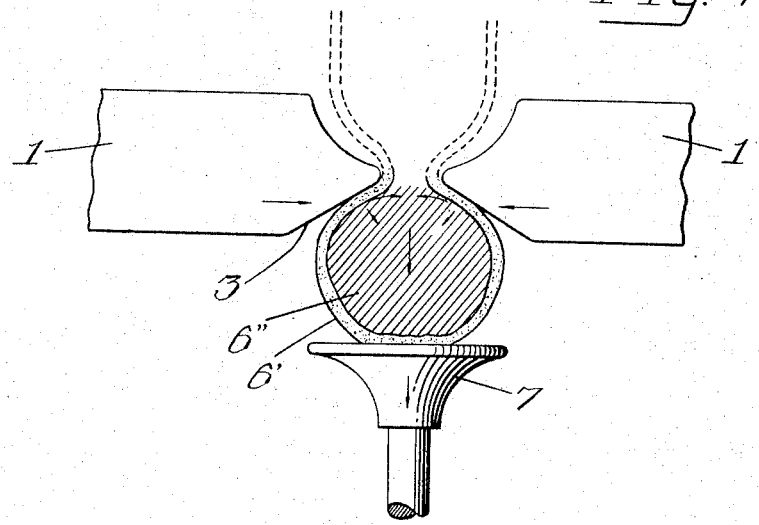
INVENTOR.
TORAHIKO HAYASHI
BY Kane and Nydick
ATTORNEYS

United States Patent Office 3,351,026
Patented Nov. 7, 1967

3,351,026
DEVICE FOR CONTINUOUSLY MAKING SPHERICAL FILLED ENCRUSTATIONS WITH DOUGH
Torahiko Hayashi, 2–3 Nozawa-cho, Tochigi-ken, Utsunomiya-shi, Japan
Filed Mar. 24, 1965, Ser. No. 442,277
2 Claims. (Cl. 107—68)

ABSTRACT OF THE DISCLOSURE

The invention relates to a device for shaping dough in the form of uniformly sized balls containing a filling, in continuous operation. The device includes means for feeding selected pieces of dough in bar form to rotary cutters which knead and otherwise form the dough bars to a generally spherical configuration of selected diameter.

---

This invention relates to the device for making uniformly sized balls out of a dough made by mixing flour, sugar, water, eggs and so on, shortening and any other materials commonly used in the making of bread, cake, etc. and continuously supplied in bar shape to the device, with a filling such as minced meat, jam or the like paste, such that each ball consists of a dough crust enveloping a filling, and concerns in particular a high-speed high-efficiency automatic device for continuously making intermediate or base products of spherical shape such as steamed or baked buns.

The cutting and forming machines hitherto used for manufacture of the above-mentioned intermediate products are essentially combinations of press molds and wedge-like blades, and are designed to accomplish the dough cuttings and ball forming process by the application of large pressure to the material. With these machines, it has been possible to form balls but, because of the pressure involved, they have been incapable of controlling the shape of filling within the ball encrustation. Moreover, where the material is a pastier dough or a sticky but crumbly dough as is used in making some types of cake, the large pressure causes the material to stick to the blade, thereby interfering with the satisfactory cutting and forming actions in continuous operation. The material under consideration is very plastic and seemingly readily workable but, because of the technical difficulty cited above, such a continuous cutting and forming process has remained as the least advanced one of the automatic production techniques for manufacture of food products made essentially of dough and formed into ball-like shape. The application of large pressure, by which the conventional process accomplishes its object, gives rise not only to the sticking of dough to the blades but also to a number of causes of quality deterioration in the material such as separation of water content from other ingredients, recrystallization and subsequent precipitation of sugar, change in property of hydrated flour, destruction of foam structures produced by a leavening agent like yeast, etc., and prevents two different component materials from lapping each other or forming distinct layers.

The object of this invention is to provide a device for continuously making spherical encrustations and for cutting the supplied material by a composite action of squeezing and rolling with the use of dynamically changing curved surfaces selected to suit each type of material in such a manner that not only the external spherical shape but also its internal structure can be effectively controlled.

Figure 1:
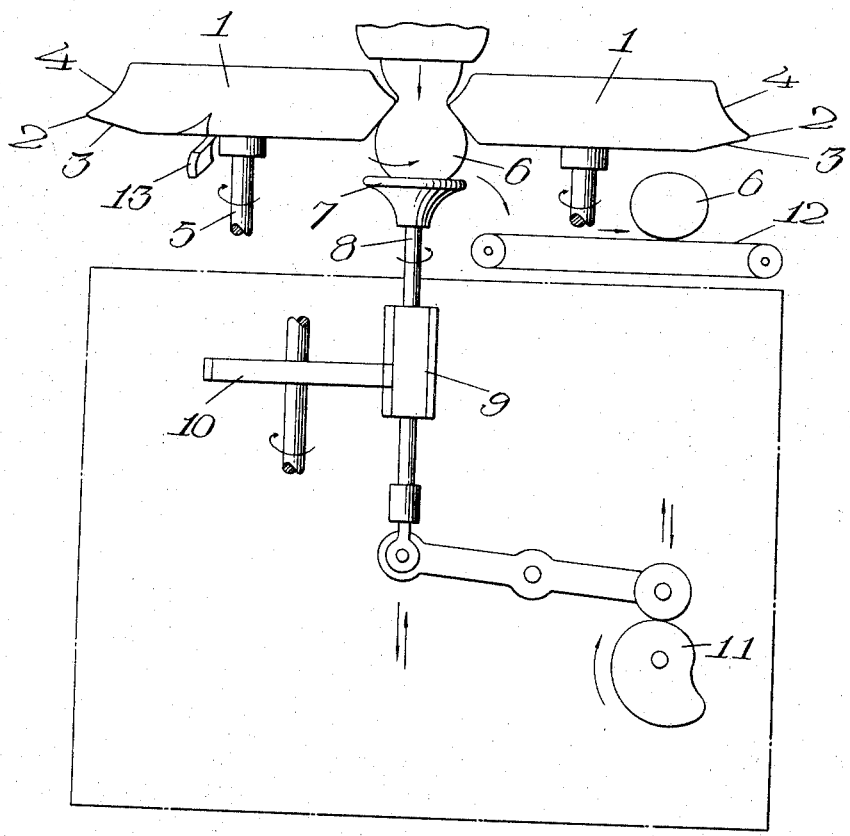
Figure 2:
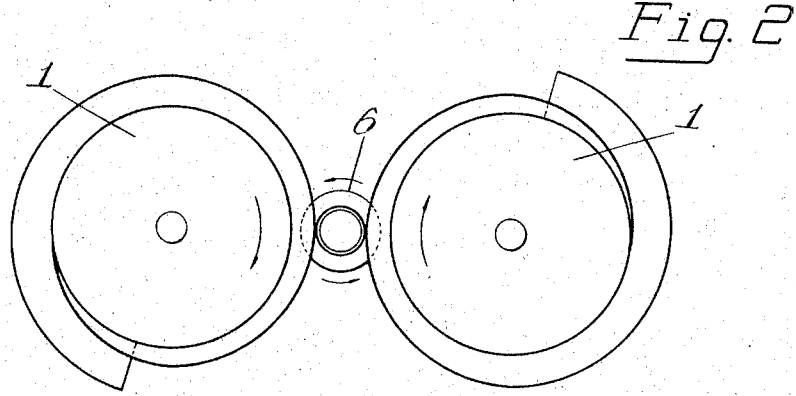
Figure 3:
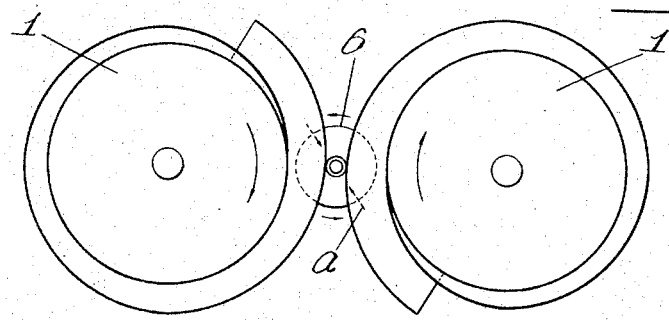
Figure 12:
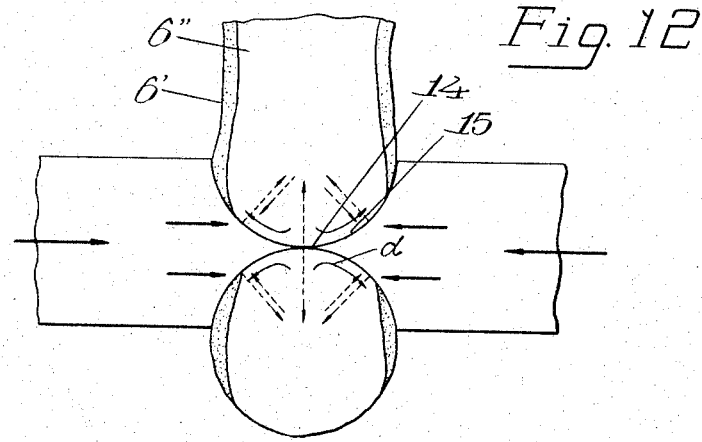
Figure 4:
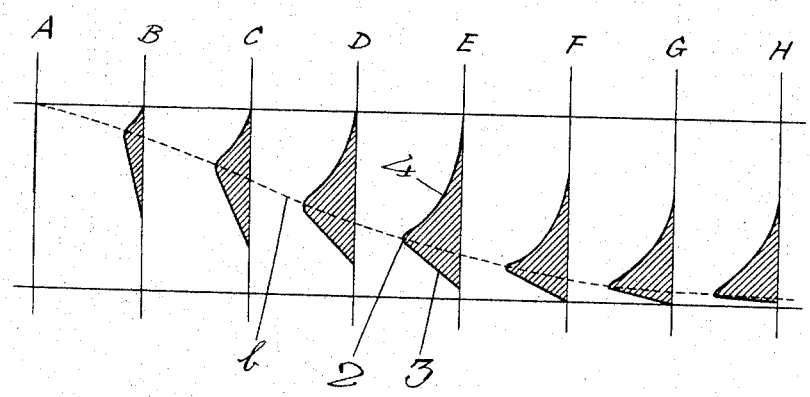
Figure 5:
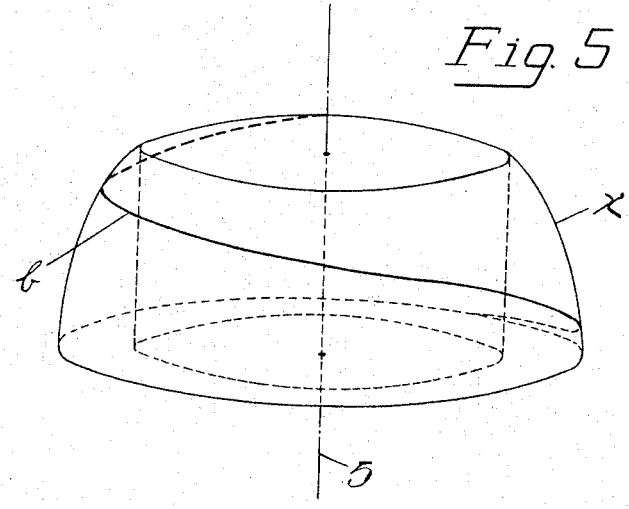

The present invention will be made clear by describing an embodiment thereof shown in the accompanying drawings, in which FIG. 1 is a side view of the cutter arrangement;
FIGS. 2 and 3 show in plan view the manner with which the opposing cutting edges come closer to each other;
FIG. 4 is a diagram for describing the shapes of cutting edge that changes with the peripheral location;
FIGS. 5 and 6 give graphic illustrations supplementary to that of FIG. 4;
FIGS. 7 to 11 inclusive are sketches for depicting the functions of cutting edges and the process of ball formation; and
FIG. 12 illustrates the operation of a conventional cutting and forming device in side view.

In FIG. 1, each rotating circular cutter 1 is provided, on its periphery, with a cutting edge 2 constituting one spiral and helical turn, such as that:

(A) The rate of increase in radius of the spiral turn decreases from the beginning or upper end to the terminating or lower end of the cutting edge which is larger in radius than the upper end;

(B) The point of the cutting edge is blunted or rounded, with a maximum inclination of the summit area given to the upper end portion, the said summit inclination being decreased toward the lower end of the cutting edge;

(C) The upper surface 4 of the cutting edge is concaved in cross section; and (D) The lower surface 3 of the cutting edge is flat, the straight side line, in cross section, of the said flat surface being decreasingly inclined from the vertical at the beginning or upper end to horizontal at the terminating or lower end of the cutting edge.

Two identical cutters constructed as above are disposed, in the same horizontal positions with their shafts 5 being arranged vertically and parallel to each other. Both cutters are made to rotate in the same direction, in synchronism and with such a fixed phase relationship that the two cutting edges 2 always meet in opposition to each other at the same but varying elevation within a range corresponding to the thickness of the cutter while the cutters 1 rotate. The material 6 is to be introduced in vertical downward direction into the separating clearance between these cutters, that is, where the edges 2 meet in opposition and, upon passing through the clearance, is to be met by a backing dish 7 rigidly mounted on a vertical rotating shaft 8 which is made to rotate with a peripheral speed of the dish preferably faster slightly than, and in the direction opposite to, that of the cutters 1.

9, 10 are a gear drive for the backing dish shaft 8, 11 a cam for moving the dish 7 up and down, 12 a conveyor for transporting formed balls out, and 13 a pawl fixed at the outer end of the cutting edge on one cutter 1 to serve as a means of ejecting each formed ball from the dish 7 onto the conveyor 12. The dough material 6 is fed in the shape of a continuous bar to the device, with an enclosed filling, and is given a rotary motion with a peripheral speed preferably faster slightly than, and in the direction opposite to, that of the cutters 1 while it is being introduced into between the cutters. As is evident dough bar 6 is gradually lowered by the downward movement of dish 7 and shaft 8 as controlled by cam 11. The speed of feeding is made preferably lower slightly than the descending speed, during rotation, of the spiral line $b$ of which mention will be made later. Of the formed ball, shown in FIG. 7, 6' is the spherical crust of dough enveloping the filling 6".

A functional description in detail of the cutting edges 2 will be attempted next, in reference to FIGS. 4 and 5. In FIG. 4, the cross sections of the cutting edges taken at eight peripheral locations equally spaced apart are shown as A, B, C, D, E, F, G and H, to indicate the relative elevations of the cutting edges 2 at different locations, the dotted line *b* through the respective cutting edges corresponding to the line *b* drawn on the surface shown in the perspective view of FIG. 5. This surface, designated as X, is generated by two motions, namely, a rotational motion and a downward motion, the portion of the surface below line *b* being the larger one. The spiral line *b* on the surface X represents the cutting edge. The generated surface X with a progressively decreasing rate of increase in radius is not conical nor bell-like but is nearly hemispherical. The pitch of the spiral line *b* may not always be the most favorable one, but the cutting edge must not be in excess of one turn and a half. The edge 2 should not be so sharply pointed as in a cutting tool but be rounded, with a maximum inclination of its lower face at the beginning or upper end of the spiral line *b* as will be seen in sections A, B and C, and made increasingly sharp in downward direction, as will be seen in sections F, G and H, FIG. 4. Though the top surface 4 is to be concaved and the bottom surface 3 to be flat, the inclination of the straight side line in cross section of the latter surface must decrease from vertical to horizontal, as shown in A and H.

In the cutting and forming device so arranged and constructed as above, the feeding of the material 6 in continuous bar shape into the separating clearance between the two rotating cutters 1 results in a separation of the forward portion of the material from the rest by a composite rolling and squeezing motion as shown in FIGS. 2 and 3, not by a simple motion as is involved in the conventional head-on wedging action, which is enacted by the pair of cutting edges 2 whose helical pattern is such as to reduce the separating clearance between cutters 1 to a practical zero at the end of each cycle of operation. Stated specifically, at the beginning of each cycle, the upper ends of both cutting edges come to the separating clearance and meet each other in opposition; and, thereupon, with their nearly vertical surfaces 3, they contact the material 6 in a rolling motion, the initial sliding motion between the material and each edge 2 being in a tangential direction as shown in FIG. 7. The separating clearance narrows increasingly to squeeze the material, as will be seen in FIGS. 2 and 3. In the meantime, the friction in the rolling contact between the material 6 and the bottom surfaces 3 is such as to apply a force in the direction of *a*, shown in the plan view of FIG. 6 and in the side view of FIG. 7, to the crust 6′, which, under this force, tends to shift in the direction of *c* shown in FIG. 6. Because the surfaces 3 are changing their inclination continuously during the cycle with respect to the material being squeezed to make the necked portion of material increasingly small, the force working on the crust 6′ changes its direction from vertical to horizontal in cross section, so that, by the time the neck is cut off, the crust 6′ becomes arced more and more and finally rounded to take a hemispherical shape for the top half of the ball.

While the top half of the ball is being formed as above, the bottom half is supported by the backing dish 7 whose functions are to hold the end portion of material 6 being balled so as to maintain a constant pressure in the rolling contact between the top half and the bottom surfaces 3 of cutters 1, and to give a proper rotary motion to the material 6 in order to assist the uniform spherical crust forming action of the surfaces 3 in completing the formation of a round encrustation. To accomplish these functions, the dish 7 is arranged to rise to a proper level upon completion of each cycle, that is, immediately after a ball has been formed and ejected by the pawl 13 onto the conveyor 12 and, while the foregoing sequence of actions is taking place, to lower gradually. The vertical reciprocating movement of the dish 7 is effected by means of a cam 11 in one mode of the application of this invention shown in FIG. 1.

Figure 8:
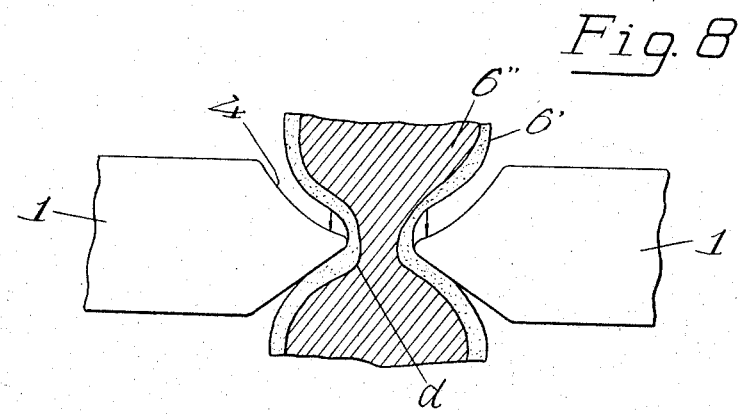
Figure 9:
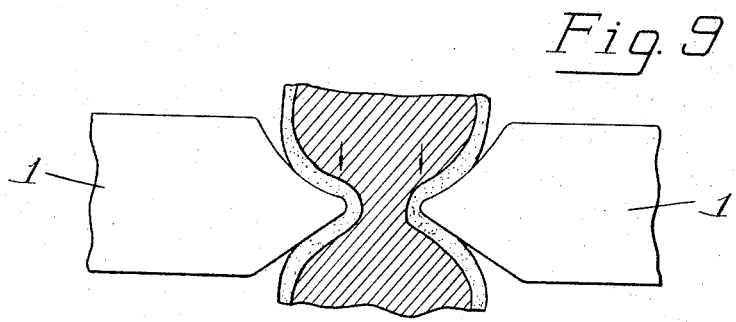
Figure 10:
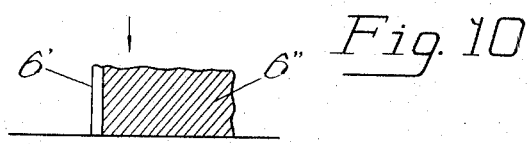
Figure 11:
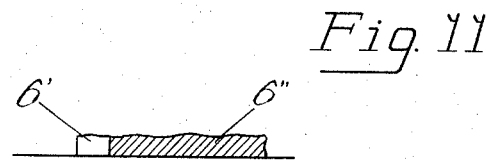

Since the speed of feeding the material 6 is to be lower than the speed with which the edges 2 descend with respect to the material during each cycle of operation, some amount of clearance can occur between the top surfaces 4 and the crust 6′, as shown in FIG. 8. But, because of the weight and plasticity of the material itself, this portion of material tends to conform to the curvature of the surfaces 4. By properly varying the pitch of the spiral line *b* and by determining the angle of descent of the line at a proper value, the thinned crust 6′ at the neck part can be made to recover the original crust thickness or even a greater thickness as illustrated by the transition from the state of FIG. 10 to that of FIG. 11. Moreover, since the top part *d*, FIG. 8, of the crust is gathered toward the center by edges 2, the cutting off of the filling 6″ is effected without the exposing thereof. The cutting off of the neck results in a complete covering up of the filling 6″ by the crust 6′.

In order not to expose the filling 6″ at the cut ends, it is absolutely necessary to avoid the wedging action of the cutting edges 2 upon the material. For this reason, this invention contemplates as large a summit area as possible on the edge 2 at the top end of the cutting edge, and also a speed of squeezing or constricting movement proportional to the diameter of material at each moment during the cycle. Specifically stated, a construction of 10 mm. is good for 30 mm. in diameter, then a constriction of up to 1 mm. must be taken for 3 mm. in diameter. In other words, the constricting or squeezing speed must be determined by taking into account the fact that the diameter of material becomes smaller as the constricting action proceeds in each cycle. This is the reason why the cutter 1 is required to satisfy the conditions A and B as hereinbefore stated. Since the cutting action according to this invention is essentially that of squeezing, the edge 2 is to be made increasingly sharp from its upper end down to lower end to insure an accurate position at which a cut is made.

In a cutting and forming operation effected with a device according to this invention, using a dough made of 100 parts of flour, 60 parts of sugar and 40 parts of water by weight and kneaded to a sticky but crumbly consistency and a bean-paste filling of ordinary consistency, the filling in each ball was perfectly covered up by the dough crust, and the sticking of dough and filling to the cutters was effectively prevented by supplying only a small amount of dry flour to the cutter edges in operation. No difficulty whatsoever was encountered in a continuous operation lasting as long as 10 hours, to bespeak very effective distribution of force and much reduced contact pressure in the forming process and to evidence a process much superior over the conventional forming process using press molds. In one mode of operation according to this invention, using a constant speed of feeding the materials, balls of various diameters were satisfactorily made by varying only the rotating speed of the cutters 1 to which the backing dish 7 is raised, to suit the diameter of the ball, that is, by selecting a proper value for the minimum distance between the backing dish and the bottom surfaces 3.

In the known cutting and forming device shown in FIG. 12, the sharp cutting edges 14 are formed by edge sides 15 upon the periphery of rotating discs, the said sides 15 being concaved in cross section to present female cutters for forming the material into the desired shape. The directions of force, pressure and displacement involved in the cutting process by this conventional device are indicated in FIG. 12. The heavy solid lines indicate the applied force, the dotted lines the directions of internal pressure and the light solid lines the directions of shift within the material. It will be noted that the filling 6″ shifts sidewise as the edges 14 and sides 15 wedge into the material and, as a result, it moves toward the crust 6′. Just before a cut is completed, the crust 6′ might fold inward but will not cover up the filling because of insufficiency of its inward folding. The large pressure accompanying this wedging action causes the filling 6″ to stick to the edges 14 and sides 15 to interfere with the satisfactory separation of the material from the cutters after each forming.

I claim:

1. A device for making uniformly sized spherical encrustations out of a dough enclosing a filling such as is used in the making of cakes or buns, in which a pair of identical rotary circular cutters, complete with spiral and helical cutting edges formed on the cutter periphery and also with shafts disposed parallel to each other, are arranged in the same positions and close to each other with a small separating clearance and made to rotate with the same speed in such a way that the cutting edges meeting in opposition to each other at the said clearance are always at the same but varying elevation; the said cutting edge on each cutter being so shaped that the rate of increase in radius of the spiral decreases, the straight side line in cross section of the lower level of the cutting edge decreases its angle of inclination from vertical to horizontal, and the sharpness of the edge increases, from the beginning or uppper end toward the terminating or lower end of the helical cutting edge; the upper side of the cutting edge being concaved; the said edge being generally blunted at the point with a maximum inclination of the summit area given to the upper end portion; and the said dough in continuous bar shape being supplied downward and into the clearance between the two cutters, where the dough is acted on by the cutting edges to be shaped into one ball after another in endless succession.

2. A device according to claim 1, in which a rotating backing dish is provided, as located under the separating clearance between the two cutters, its centers of rotation coinciding with the vertical line passing through the middle of the said clearance.

References Cited

UNITED STATES PATENTS 1,958,189   5/1934   Ecklund _____ 107—4

FOREIGN PATENTS 394,995   5/1924   Germany.

WALTER A. SCHEEL, *Primary Examiner.*

J. SHEA, *Assistant Examiner.*